US007295755B2

(12) United States Patent
Ostermann et al.

(10) Patent No.: US 7,295,755 B2
(45) Date of Patent: Nov. 13, 2007

(54) METHOD AND APPARATUS FOR SIMPLIFYING THE ACCESS OF METADATA

(75) Inventors: Ralf Ostermann, Hannover (DE); Hui Li, Hannover (DE); Meinolf Blawat, Hannover (DE); Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1100 days.

(21) Appl. No.: 10/155,371

(22) Filed: May 23, 2002

(65) Prior Publication Data

US 2002/0198864 A1     Dec. 26, 2002

(30) Foreign Application Priority Data

Jun. 22, 2001 (EP) ................... 01115226
Mar. 26, 2002 (EP) ................... 02006879

(51) Int. Cl.
 *G11B 27/00* (2006.01)
 *H04N 5/91* (2006.01)
(52) U.S. Cl. .................... 386/52; 386/83; 725/39; 725/46
(58) Field of Classification Search ............ 386/1, 386/46, 83, 52, 69; 725/22, 39, 46, 47
 See application file for complete search history.

(56) References Cited

U.S. PATENT DOCUMENTS

2002/0053084 A1 * 5/2002 Escobar et al. ............ 725/47

FOREIGN PATENT DOCUMENTS

| EP | 1073223 A1 | 1/2001 |
| EP | 1073223 A1 * | 1/2001 |
| EP | 1079623 A1 | 2/2001 |
| WO | WO00/05884 | 2/2000 |

OTHER PUBLICATIONS

M. Ceccarelli, G. Mekenkamp, E. Persoon, *Home Multimedia Systems: on Personal Video Libraries*, 4 pages.
Alan Hanjalic, Geerd Kakes, Reginald L. Lagendijk, Jan Biemond, *Dancers: Delft Advanced News Retrieval System*, pp. 301 to 310.
Abstracts of Japan.
EPO Search Report.

* cited by examiner

*Primary Examiner*—Thai Q. Tran
*Assistant Examiner*—Mishawn Dunn
(74) *Attorney, Agent, or Firm*—Joseph J. Laks; Ronald H. Kurdyla; Joel M. Fogelson

(57) ABSTRACT

Available storage media capacity for personal video recording increases continuously. metadata can be used to organize the recordings, search for content and access specific recordings. If metadata are embedded within the multimedia content itself, like DVB specific Service Information, which are multiplexed with the audio and video streams to form a MPEG-2 transport stream, a search based on this metadata would require an inefficient and time consuming search through all multimedia content stored. According to the invention metadata information is gathered, analyzed and processed to form metadata entities, which are amended by a reference to the content itself. A descriptor stream is formed from the resulting pairs of metadata entities and references to the content and is stored separately from the files comprising multimedia content. In this way, for data of an MPEG-2 transport stream the metadata can be accessed without a need to reparse the entire stream.

12 Claims, 1 Drawing Sheet

METHOD AND APPARATUS FOR SIMPLIFYING THE ACCESS OF METADATA

FIELD OF THE INVENTION

The invention relates to a method and to an apparatus for simplifying the access of metadata, which are associated with a file comprising multimedia data or a part of said file, especially for describing the content of said multimedia data and/or searching said file or file part among a plurality of files comprising multimedia data, wherein the metadata are originally multiplexed with said multimedia data.

BACKGROUND OF THE INVENTION

The available storage media capacity for personal video recording increases continuously, approximately doubling every 2 years. Currently it is possible to store about 20 full-length movies on a single 100 GByte hard disk. In 2005, it will likely be possible to store about 80 movies on a single 400 GByte hard disk.

Similar figures apply to optical recording: currently about 5 GByte can be stored on a single layer single sided DVD disc but the DVR recorder as a successor of the today's DVD recorder will allow storage of up to 35 GBytes on a corresponding disc. Furthermore, two or even more layers can be used per side and these can be applied to both sides of the disc. Finally, it is possible to combine several discs in a special magazine.

This enormous amount of data requires new ways to organize the recordings, search for content and access specific recordings, because it is no longer possible to find recordings in a user's book shelf by just looking at the video cassettes/discs and some annotations on their cover. One possible solution for this is to use so-called metadata, defined as data about data, for the recorded content.

Metadata can be embedded within the multimedia content itself. For example, the MPEG-2 systems standard as specified in ISO/IEC 13818-1 defines program specific information (PSI) which is multiplexed with the audio and video streams. Similarly, the DVB standard used for the transmission of digital television signals specifies Service Information (DVB-SI) included in a DVB compliant MPEG-2 transport stream multiplex.

SUMMARY OF THE INVENTION

The invention is based on the recognition of the following fact. Given the availability of metadata multiplexed into the multimedia content itself; it is possible to access the metadata directly from the bitstream, like the DVB-SI information directly from the MPEG-2 transport stream. However, for recorded data like a broadcasted DVB television signal which is recorded on a disc after reception, a search based on this metadata would require a full search through all multimedia content stored in order to collect that metadata. This is both inefficient and time consuming.

Accordingly, one aspect of the invention makes metadata information multiplexed into the multimedia content available for automatic and/or electronic access, in particular for metadata based searches, browsing, and presentation engines.

Accordingly, another aspect of the invention advantageously extracts metadata from the multiplexed multimedia content. The extracted metadata are gathered and analyzed to form metadata entities, which are amended by a reference to the content itself. A descriptor stream is formed from the resulting pairs of metadata entities and references to the content and is stored separately from the files comprising multimedia content.

In this way, the metadata attached to the multimedia content allow for efficient automatic content referencing, content location, and automatic access, and electronic access.

Advantageously, the invention can be used for accessing metadata addressing a file or parts of a file recorded on a storage medium. In this case, processing the metadata is performed during a recording process of the files comprising multimedia content. Especially, for data of a recorded MPEG-2 transport stream, this process allows for the accessing of metadata without a need to reparse the entire stream.

The processing of the metadata can be performed during the recording process of the files or file parts. This has the advantage that the metadata are immediately available for metadata-based searches.

Accordingly, another aspect of the invention advantageously processes the metadata in an offline pass after the recording process, e.g. if an MPEG transport stream is recorded as it is without demultiplexing of the elementary streams.

Accordingly, another aspect of the invention advantageously completes the metadata extraction from the multimedia content multiplex by retrieving metadata from another source, e.g. by metadata transmitted by a service provider via internet.

Accordingly, another aspect of the invention advantageously supplements metadata extracted from the multimedia content multiplex by input from the user, e.g. using a keyboard. This allows the user to make personal annotations.

Further advantageous aspects of the invention are described below.

BRIEF DESCRIPTION OF THE DRAWINGS

Exemplary embodiments of the invention are described with reference to the accompanying drawing.

DETAILED DESCRIPTION OF PREFERRED EMBODIMENTS

Figure 1:
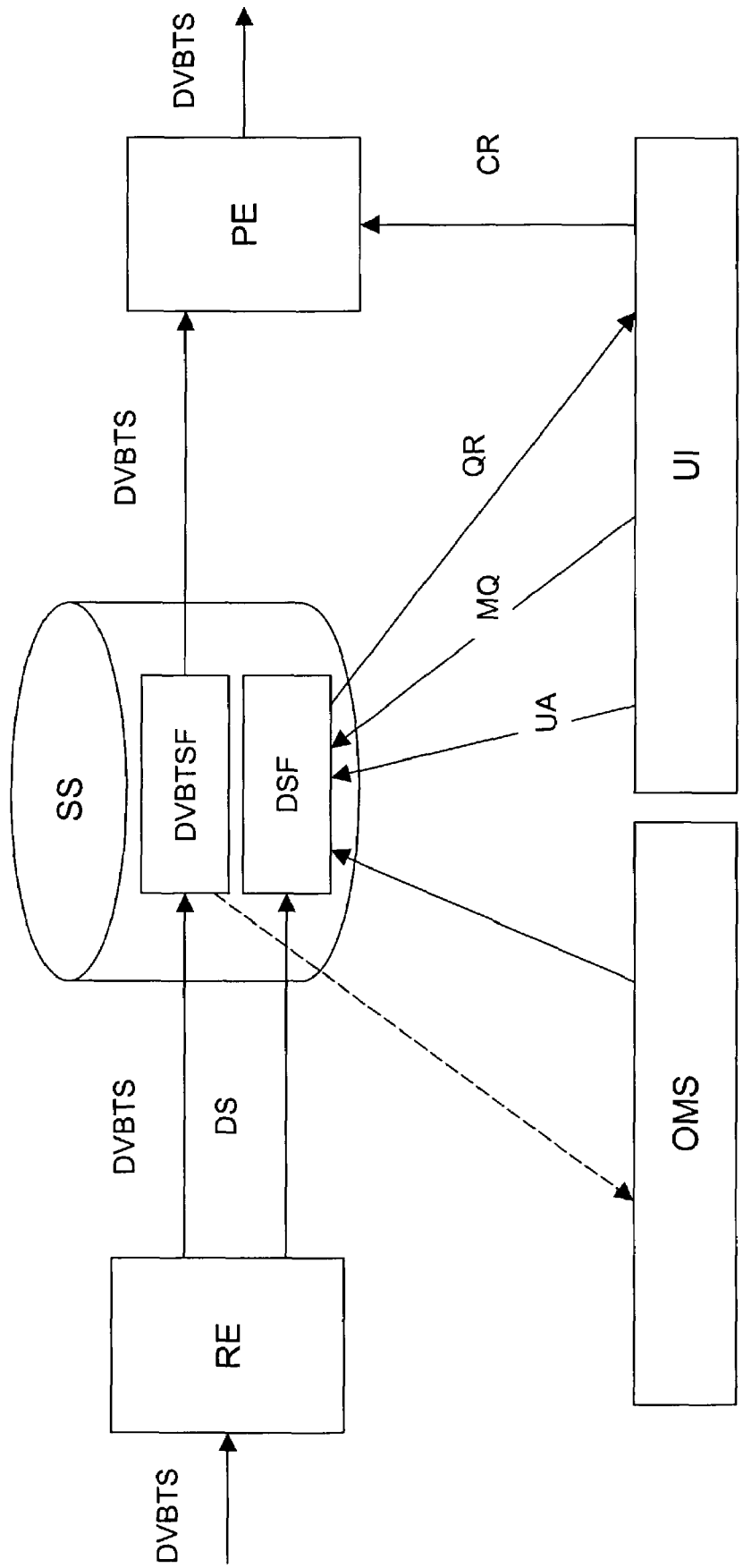
FIG. 1 displays the processing of a separate descriptor stream comprising metadata.

Exemplary embodiments of the invention are described in the following specification. Although the further description concentrates on the processing of an MPEG-2 transport stream, most embodiments of the invention can easily be generalized for use in any kind of multiplexed bitstreams comprising metadata.

In FIG. 1 a DVB compliant MPEG-2 transport stream DVBTS containing multimedia data and DVB-SI data represents the multimedia content multiplex. The multimedia data can comprise arbitrary data, but especially includes video and audio data. The DVB-SI data consists of metadata carrying Descriptors that are encapsulated into SI sections and SI tables and may stretch across multiple MPEG-2 transport packets, that are not necessarily consecutive inside the transport stream multiplex. For further details reference is made to the MPEG-2 systems standard ISO/IEC 13818-1.

The recording engine RE collects all the data bytes that belong to a given DVB-SI Descriptor from the MPEG-2 transport packets and it also memorizes a position reference inside the MPEG-2 transport stream where the DVB-SI Descriptor becomes valid. Both the Descriptor data and the start position reference are stored. From time to time, a Descriptor is collected that is meant as a replacement (update) for a Descriptor that has already been found in the same MPEG-2 transport stream, before. This means that the previous descriptor becomes invalid. The recording engine then stores the end position reference alongside the already stored start position reference of the previous DVB-SI Descriptor.

At the end of the MPEG-2 transport stream, the recording engine checks all stored DVB-SI Descriptors and stores an end position to every Descriptor that didn't become invalidated so far. The start position reference and end position reference as well as a reference to the stored MPEG-2 transport stream itself form a so-called Content Reference or a Content Locator. All pairs of Descriptor and Content Reference are arranged to form a Descriptor Stream DS, which is stored by the storage system SS separately from the MPEG-2 transport stream DVBTS. For this purpose arbitrary storage systems can be used, e.g. optical storage devices or hard disk drives. Usually, both the Descriptor Stream DS and the MPEG-2 transport stream DVBTS are stored in respective separate files DSF, DVBTSF on the same storage medium. However, for some applications it is also useful to store them on different storage media.

The Descriptor Stream can later be amended by any kind of Descriptor and Content Reference pairs. Other sources OMS than the MPEG-2 transport stream DVBTS can be used for retrieving the metadata. Especially, the metadata can be generated by automatic feature extraction, symbolized by the broken arrow in the figure, or, the metadata can be downloaded from the Internet. User annotations UA can be added as well, using the user interface UI, which may comprise a graphical display and some manual input means like a remote control or a keyboard or some speech input means. The user interface UI can also be used to launch a metadata query MQ, e.g. for accessing a certain multimedia file or scene included in the stored DVB transport stream files. The result of the metadata query, i.e. the corresponding Descriptor and Content Reference pairs, is given back to the user interface UI, especially, if the query results in more than one hit. For informing the user about the query result a corresponding display, e.g. showing a table of found files, or a speech output may be used. After the user chooses one among several found files, the Content Reference of the selected file is supplied to the playback engine PE for playback of the DVB transport stream comprising the requested file described by the Content Reference CR. However, if as a response to a query only a single file is found, the Content Reference CR and the respective DVB transport stream comprising the found file can also directly be supplied to the playback engine PE skipping the user selection process.

Instead of amending complete Descriptor and Content Reference pairs, it is also possible to update, modify or replace either a Descriptor or a Content Reference exclusively.

A Descriptor Stream may also be generated by a process completely independent from the recording engine described above. If the multimedia content does not carry embedded metadata, it would also be possible to store a Descriptor Stream in the same format, but the pairs of Descriptor and Content Reference are generated from out-of-band data (e.g. user annotations, internet downloads, feature extraction).

The Descriptors in the Descriptor Stream may also be stored in a different encoding. For instance it is beneficial to transcode DVB-SI Descriptors from their binary encoding into an XML encoding. Other transport or storage encodings may exist.

For some DVB-SI Descriptors (e.g. EPG data) it is important to know, from what table or context they have been extracted from. In such cases it is beneficial to store such context information together with the Descriptor, Content Reference pairs.

Various embodiments of the invention includes the following advantages:

The separately stored Descriptor Stream allows for an easy and fast access to the metadata information by at least one of a metadata based search, browsing, and presentation engine.

DVB-SI Descriptors become valid within the multimedia multiplex as soon as they are transmitted. They are either invalidated by the transmission of a Descriptor of the same Descriptor type but with different values, or, by the end of the transmission. Having a Descriptor Stream allows for the addition of validity information (start, end) that is more convenient to use.

Descriptors from different origins may come in different encodings. The storage of a separate Descriptor Stream offers a way to have a unified encoding for the Descriptors (e.g. XML).

Descriptors may have been generated by an offline process or transmitted as out of band data. A separate Descriptor Stream offers a possibility to store all these Descriptors together.

The invention is applicable to all kinds of electronic multimedia content referencing and content location, for instance in connection with DVR standardization, metadata, Content Referencing, Content Location, Personal Video Recorder, Personal Digital Recorder, Optical Storage, Hard Disk Storage, Home Server, and Web Enabled Storage.

What is claimed is:

1. A method for processing metadata associated with multimedia content, wherein said multimedia content is located on a first storage medium, said method comprising the steps of:
   extracting said metadata from a descriptor stream, wherein said descriptor stream is located on a second storage medium and comprises at least one of: a descriptor pair related to said multimedia content and a reference pair related to said multimedia content; and
   enabling an operation using said metadata, wherein said operation comprises at least one of: amending said descriptor stream, storing said descriptor stream, searching said multimedia content via a metadata query, playing said multimedia content, forming an electronic program guide using said metadata.

2. The method of claim 1, wherein said descriptor stream is are generated from multiplexed metadata extracted from within said multimedia content.

3. The method of claim 1, wherein said amending of said descriptor stream uses external source metadata.

4. The method of claim 1, wherein said metadata is supplied by user input.

5. The method of claim 1, wherein said descriptor pair are transcoded from a first encoding into a second encoding.

6. The method of claim 5, wherein said descriptors are generated by an offline process or from out-of-band data.

7. The method of claim 1, wherein said enablement step is activated via a use of a user interface.

8. The method of claim 1, wherein said references comprise position references to the stored multimedia content.

9. A device for processing metadata associated with multimedia content, wherein said multimedia content is located on a first storage medium, said device comprising:
   means for extracting said metadata from a descriptor stream, wherein said descriptor stream is located on a second storage medium and comprises pairs of descriptors and references, said descriptors and said references being related to said multimedia content; and
   means for enabling an operation using said metadata, wherein said operation comprises at least one of: amending said descriptor stream, storing said descriptor stream, searching said multimedia content via a metadata query, playing said multimedia content, and forming an electronic program guide using said metadata.

10. The device of claim 9, further comprising a user interface suited for supplying metadata and/or for activating said means for enabling an operation.

11. The device of claim 9, further comprising means for transcoding said descriptors from a first encoding into a second encoding.

12. The device of claim 9, wherein said references comprise position references to the stored multimedia content.

* * * * *